Jan. 12, 1965 H. C. EDWARDS 3,165,257
PRESSURE INDUCER
Filed Oct. 3, 1962 2 Sheets-Sheet 1

INVENTOR.
Howard C. Edwards
BY
*John Gibson Semmes*
ATTORNEY

Jan. 12, 1965 H. C. EDWARDS 3,165,257
PRESSURE INDUCER
Filed Oct. 3, 1962 2 Sheets-Sheet 2

INVENTOR.
Howard C. Edwards
BY John Gibson Semmes
ATTORNEY

United States Patent Office
3,165,257
Patented Jan. 12, 1965

3,165,257
PRESSURE INDUCER
Howard C. Edwards, 2443 Whipple Road NW.,
Canton, Ohio
Filed Oct. 3, 1962, Ser. No. 228,194
4 Claims. (Cl. 230—127)

The present invention relates to the art of inducing high pressure pneumatically and has particular reference to pressure blowers of the type suitable for materials handling.

In such systems, it has been found expedient to expose the pressure blower to atmospheric pressure within an enclosure and in certain instances to exhaust induced pressure within the enclosure; for in this manner, internal building construction heat is retained. Materials handling may be effected to transport flexible ribbon-like materials, granular and comminuted substances, dust particles, abrasive grains, cuttings from sheet-like materials by creating from five to ten pounds pressure in the pneumatic tubes. This is accomplished by introducing the materials-handling high pressure blower and draft inducer into a conduit between point of loading of conduit and unloading or exhaust. A typical example of the utility of this system may be apparent from reference to the storing and transport of granulated insulating cork, where the invention is employed in lieu of a mechanical conveyor adapted to transfer granulated cork from hopper on unloading dock into a high material storage room. Other uses include installing the high pressure units in storage rooms to maintain same under constant negative pressure; in this way exhausting dust-laden air from storage rooms following passing same through a water spray scrubber, the motor, fans and bearings of the blower unit being free of and unaffected by dust, abrasive or other corrosive materials handled.

This invention is closely related to Patent 2,722,372, Draft Control Apparatus, issued November 1, 1955, on an application filed April 2, 1952. In that invention, a draft control apparatus was defined in which well known fan means for artificially inducing draft was applied to the venturi-cone, flue insert there patented. In the present instance, invention resides in the artificial draft inducer per se, wherein means are provided for creating high pressure through low output, the artificial draft inducing means being adapted to draft inducer flue assembly of the type defined in United States Patent 2,722,372, aforementioned. One of the principal features of this invention resides not only in the ability to create high pressure through low output, but also to create such pneumatic pressures without substantial temperature increase of air brought in under atmospheric pressure. In the art such temperature increase of pressurized air causes the lubricants and working parts of the fans to break down, increasing problems incident to the transport of heat-resistive materials. Heretofore, it has also been impractical to use high pressure turbo fans of the proposed size and type, due to the exaggerated thrust transferred to the motor bearings and moving parts. This invention overcomes these problems.

With these and other objectives in view, the invention resides in the combination shown in the drawings wherein.

Figure 1:
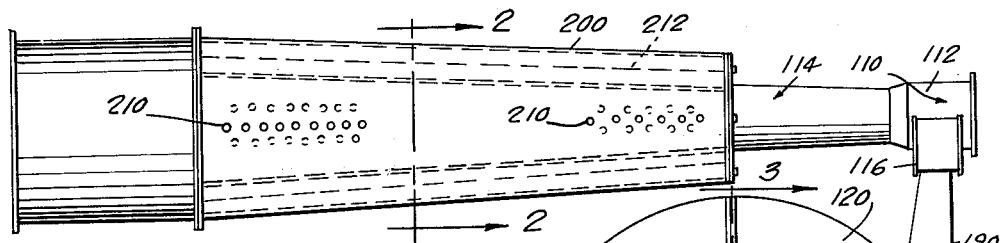
FIG. 1 is a side elevational view of the invention, applied to a section of materials conveying conduit.

Referring now to FIG. 1, the high pressure assembly 100 is shown to include draft control flue, insert 110, this being a section of tubular conveyor conduit, said draft control insert including plenum chamber 112, the walls of which diverge in a dihedral from the circumference of the conduit and are connected at their opposite end to pressurized air expansion conduit 114, said expansion conduit being connected as at 116 to the artificial air blower 100. The plenum chamber 112 has been expanded in volumetric area over that shown in Patent 2,722,372 above recited. In practice on a high pressure blower of 43" diameter I intend to create 6–7# pressure in the system by turning the blower wheel at 3600 r.p.m.

A typical pilot installation has included a stainless steel materials handling tube 77" long, 60 H.P., 3,450 r.p.m. motor journalled to a high pressure blower of the type shown herein, exhausting into a 13' x 15' x 15' storage room, pulling through 400 ft. of open 8" pipe. Negative static pressure readings taken 7 diameters back of the compression and expansion chamber were 17.6" W.G., velocity 11,676 f.p.m. pulling 135 ft.; 18.6" W.G., velocity 9,306 f.p.m. pulling 270 ft.; 19.3" W.G., velocity 6074 f.p.m. pulling 400 ft.

Returning to FIG. 1, the high pressure blower 100 is suitably mounted in engagement with a drive motor shown in the rear, said drive motor and blower being interconnected to an appropriate stand elevating same from the floor. High pressure blower 100 includes a circular outer cover 122 having a central air inlet aperture 124, bounded on its exterior by a plurality of reinforcing span trusses 126. This removable cover 122, which may be defined as a first radial wall, together with second radial wall 130 and a portion of annular wall 134 define the pressure chamber or pumping chamber 128, best shown in FIG. 3. A third radial wall 136 and axial wall 137 cooperate with the remaining portion of peripheral wall 134, and with baffle extension 132 of wall 130 to form collecting chamber 129. The outward edge of baffle 132 and opposite peripheral wall 134 define a restricted annular opening between pumping chamber 128 and collecting chamber 129.

Referring now to the pressure chamber 128, it will be noted that it is circular in configuration, having its annular wall 134 spacing the cover 122 from rear wall 130. Centrally of the depression formed by the rear wall of the chamber 128 is a suitable aperture for the shaft 180, said shaft connecting the motor to the fan of FIGS. 4 and 5.

Figure 3:
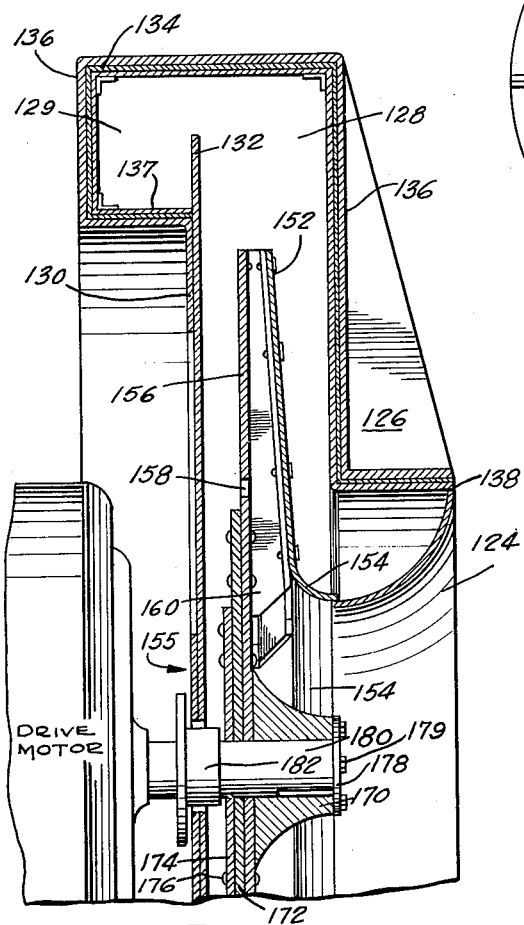
FIG. 3 is a view in vertical section of a fragment of the blower assembly taken along lines 3—3 of FIG. 1.
Figure 4:
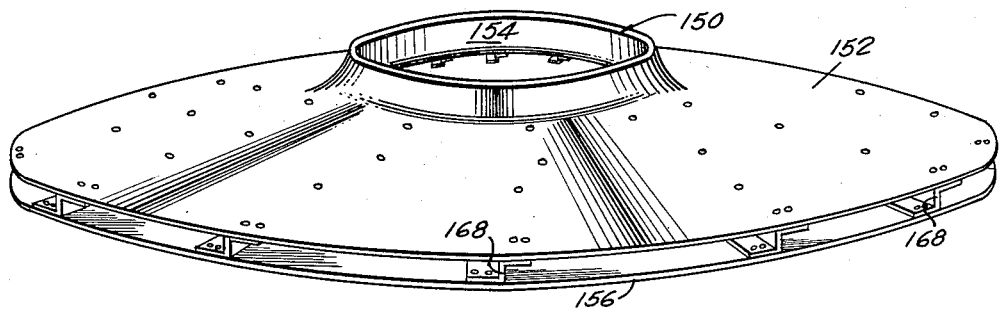
FIG. 4 depicts the turbo blower wheel in perspective.
Figures 5, 6:
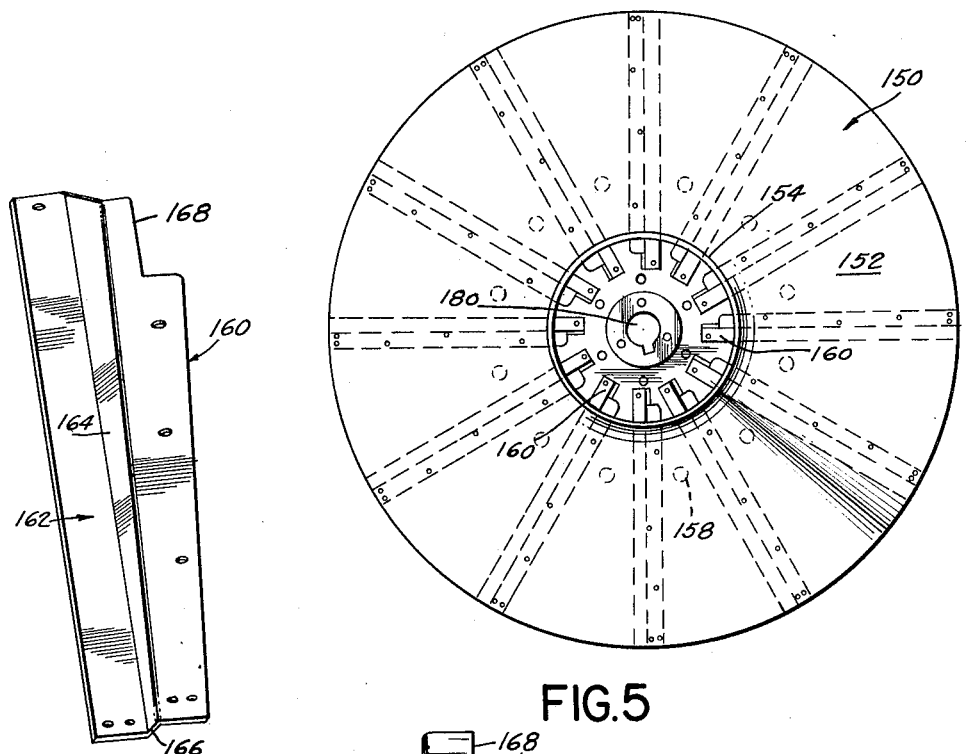
FIG. 5 shows the blower wheel in top plan.
FIG. 6 is a view in perspective of a blade of the type employed in the FIG. 4 blower wheel.
Figure 7:
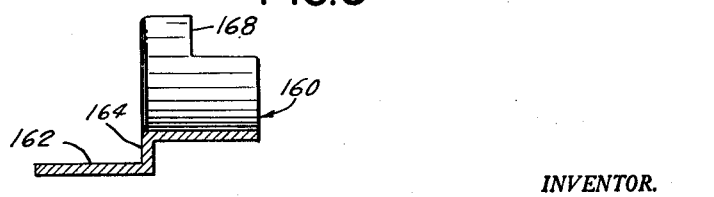
FIG. 7 is a vertical sectional view along lines 7—7 of FIG. 6.

The fan 150 shown in FIGS. 3, 4 and 5 includes two basic discs rigidly held in spaced relation by a plurality of radially extending blades 160. More specifically, fan 150 comprises discs 152 and 156 respectively, the outer disc 152 being of frusto-conical design and having an aperture 154 centrally thereof to receive pressure at zero atmospheres. It will be noted that the sloping design of the disc 152 from center outwardly, is such as to conform to the related configuration of the blades 160, one of which is shown in FIGS. 6 and 7. Adjacent aperture 154 the conical disc is curvilinear in cross-section. See FIG. 4 in this connection.

The inner counterpart of disc 150, namely blade supporting member 155 comprises a plurality of superposed flat plates, each of decreasing diameter with respect to the other. Three such discs are shown in FIG. 3. Each of the respective plates comprising disc 156 is held contiguous to its smaller counterpart, lending to the aluminum load bearing disc 156 a reinforced axle-engaging center complemental to hub 170 which is keyed to the shaft 180 as shown in FIG. 3. The largest of plates 156, engaging the blades, is pressure "relief" apertured at 158 in a concentric ring of apertures, 29% along a radian from the periphery of the disc. In a 43" diameter wheel, for example, the apertures are twelve in number and placed at 12¾" from the center outward, the apertures being ⅞" to 1⅛" in diameter. The ratio of a 43" diameter wheel area to aperture area is 1452 sq. in. to .6013 sq. in. for a ⅞" aperture or .9940 sq. in. for a 1⅛" aperture. The smallest circular plate 174 is made of steel as is the end hub 178. The effect of these elements is to bind the aluminum blower wheel to the shaft during high pressure operation as will be apparent.

As indicated, the blower wheel apertures 158 control end thrust pressure on the motor, bearings, reducing it to zero, ideally. For smaller diameter flow systems 200 using the same blower wheel the apertures will be increased in diameter to compensate for the increased pressure. If one were to increase the size of the relief apertures more than necessary to accommodate for the pressure on the thrust bearings, a reverse action would take place and the thrust by centripetal action would drive into the motor on the drive shaft. This is due to the fact that the relief apertures release the pressure normally but, if increased too great, the pressure would shift to the forward face of the blower wheel forcing it inwardly and causing excess thrust on the bearings.

It will be appreciated from FIGS. 5 and 6 that the blades 160 each comprise a unitary shaped element, having flat base 162, said base being adapted to rest contiguous the disc 156 and secured thereto by bolting, riveting or other suitable means. An upright wall 164 separating the respective portions 162 and 166 is provided normal to the respective 162 and 166 surfaces. However, at its innermost extremity, considering the overall fan construction of FIGS. 4 and 5, wall 164 of the blade is of increased area when compared to its outermost extremity 168. Declination angle of the top surface 166 is preferably at two (2) degrees.

The intake nozzle 124 which is best shown at FIG. 1 is secured to the outwardly extending curvilinear aperture formed by the housing 120. The design of this member is such as to insure maximum atmosphere input to the device, commensurate with its output capacity. Here, the inner extension of the respective blades 160 is such as to also permit maximum input commensurate with output capacity, reference being made to the configuration of the blades of the fan as sloping at the input end and cut away at 168, the upper portion adjacent the outwardly extending aperture of the upper disc. By design, the respective blades are given rigidity through corrugation as well as fixed attachment, exteriorly and interiorly between the respective outer compression and inner support disc 150 and 156 respectively. The design of discs, apertures thereof and blades is to insure maximum coactive results in directing and compressing the intake and output.

In operation, the flow of air is such that upon exhaust of the highly compressed air from the peripheral aperture provided between the respective compression and base discs 152 and 156, the air passes into expansion chamber 128 whereby it is permitted to expand and maintain coolness, while rotating counterclockwise in the direction of tangential outlet 190, provided at the bottom of the fan housing. The outlet channel 116 for the highly compressed air is set conventionally substantially tangential to the circular exterior of the housing. This principle is well recognized in draft inducing fan manufacture and is shown in Patent 2,722,372.

Figure 2:
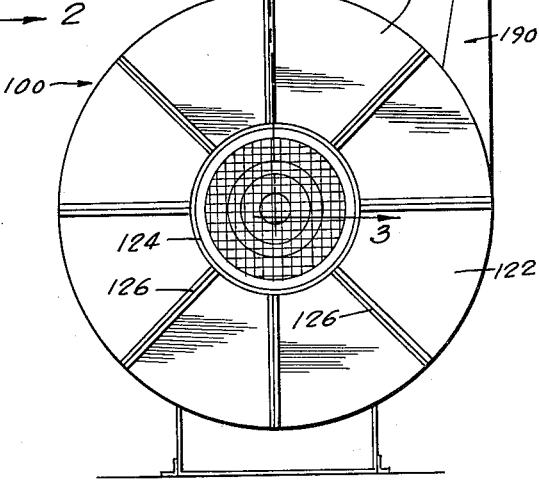
FIG. 2 is a sectional view of the tubular exhaust of invention taken along lines 2—2 of FIG. 1.

With regard to the draft inducing pipe assembly, a design comparable to that of Patent 2,722,372 while employed herein, includes the sound muffling attachment 200. This comprises a tubular extension of Miles steel in which concentric and foraminous tubes 210 contain laminates 212 and 214 of asbestos or glasswool. FIGURE 2. The angle of inclination of the walls from front to rear is at 2°. The interior tubular portion 220 is likewise apertured at 218, the apertures being alternately misaligned, to give noise access to the laminates 212 and 214. The inner laminate 214 is highly compressed with respect to the outer 212. In practice, a satisfactory muffler is being made without exterior aperture 210. In this muffler, the design being divergent, the apex of the induced draft shall occur in the vicinity of but just short the point of maximum inner circumference, thereby creating an ever more effective system of noise control.

Whereas the invention has been defined with specific reference to materials handling through pneumatic induction, it will be obvious to those skilled in the art that it may likewise be adapted to other systems of pressure control such as heating and cooling without departing from the spirit of the invention as set forth in the appended claims.

What is claimed is:

1. In a pneumatic pressure inducer having a driving means provided with a forwardly extending driving shaft, the improvement comprising: a sheet - metal rotor mounted on the forward end of said shaft; said rotor having a central hub keyed to said shaft, an end plate secured to said hub and to said shaft for limiting axial displacement of said rotor relative to the shaft, an annular blade supporting member secured to the opposite end of said hub from said end plate and extending radially from said hub in a plane normal to the axis of the shaft, said supporting member comprising a stack of annular sheet metal discs of decreasing radial diameter, a plurality of blades fixed radially about an axis of the disc having the largest diameter and concentrically spaced about the axis, each blade having a generally triangular shape converging in a radially outward direction, and lying in a generally radial plane, a conical disc secured to converging sides of the blades and defining a central intake opening for the rotor; a sheet metal housing mounted concentrically about said rotor and enclosing the same, said housing comprising first, second and third axially spaced, flat walls and a peripheral annular wall secured to the first and third walls; said first and second walls and a portion of said peripheral wall defining a pumping chamber for the rotor; said second and third walls and a remaining portion of said peripheral wall defining a collecting chamber; said second wall and said peripheral wall defining therebetween a restricted annular opening for communication between the pumping chamber and the collecting chamber; said housing having a tangential, outwardly converging discharge outlet communicating with said collecting chamber; said rotor having a plurality of holes in the disc having the largest diameter, equally spaced radially from the axis of the rotor, whereby axial thrusts on the supporting disc and on the conical disc are equalized; and means in said first wall providing communication with the intake of the rotor.

2. The improvement of claim 1 wherein said end plate and the disc having the smallest diameter are constructed of steel, and the remainder of said rotor is constructed of aluminum.

3. The improvement of claim 1 further comprising a bolt received in a central aperture of said end plate and threadably received in said shaft, thereby locking said rotor against axial movement on said shaft.

4. The improvement of claim 1 wherein each of said blades comprises a central face defining first and second longitudinally oriented converging edges and flanges integrally formed at said longitudinal edges, said flanges being turned away from each other normally to said face, and a divergent end of one of said flanges being cut away, thereby partially defining an intake.

(References on following page)

References Cited by the Examiner
UNITED STATES PATENTS

| | | | |
|---|---|---|---|
| Re. 23,126 | 7/49 | McCracken | 230—127 |
| 1,330,547 | 2/20 | Mehlhof | 230—127 |
| 1,423,190 | 7/22 | Clements | 230—127 |
| 1,462,592 | 7/23 | Bentley | 103—112 |
| 1,676,946 | 7/28 | Fechheimer | 230—134 |
| 1,754,724 | 4/30 | Mead | 230—133 |
| 1,862,523 | 6/32 | Anderson | 230—133 |
| 2,069,640 | 2/37 | Beardsley | 230—127 |
| 2,285,338 | 6/42 | Kidney | 230—133 |
| 2,537,084 | 1/51 | Pfarrer | 103—114 |
| 2,641,191 | 6/53 | Buchi | 230—134 |
| 2,899,129 | 8/59 | Schwaiger | 230—134 |
| 2,991,844 | 7/61 | Nomar | 230—134 |
| 2,997,958 | 8/61 | Heinicke | 230—133 |

References Cited by the Applicant
UNITED STATES PATENTS

| | | |
|---|---|---|
| 3,010,697 | 11/61 | Lazo. |
| 3,044,683 | 7/62 | Woollenweber. |
| 3,077,297 | 2/63 | Clarke. |

JOSEPH H. BRANSON, Jr., *Primary Examiner.*